United States Patent [19]
Goker

[11] Patent Number: 6,101,061
[45] Date of Patent: Aug. 8, 2000

[54] METHODS AND APPARATUS FOR CALIBRATION OF A ROTATING SCANNER TO A PLURALITY OF DATA TRACK GROUPS RECORDED ON A TAPE

[75] Inventor: Turguy Goker, Solana Beach, Calif.

[73] Assignee: Seagate Technology, Inc., Scotts Valley, Calif.

[21] Appl. No.: 08/943,041

[22] Filed: Oct. 1, 1997

[51] Int. Cl.[7] .................................................. G11B 15/46
[52] U.S. Cl. .................................. 360/73.08; 360/77.13; 360/51
[58] Field of Search ........................... 360/77.12, 77.13, 360/77.14, 73.01, 73.04, 51, 53, 73.07, 73.08

[56] References Cited

U.S. PATENT DOCUMENTS 5,546,247  8/1996  Fujioka et al. ................... 360/77.14 X
5,796,537  8/1998  Goker et al. ........................... 360/75 X
5,959,799  9/1999  Deoka ............................... 360/73.08 X

*Primary Examiner*—Andrew L. Sniezek
*Attorney, Agent, or Firm*—McDermott, Will & Emery

[57] ABSTRACT

A scanner in a helical tape drive is calibrated to read a plurality of data track groups recorded on a tape via a servoing system controller that monitors a scanned signal, detects an offset region for an appended group of tracks, calibrates the scanner to the appended group of tracks, stores alignment data associated with the calibration in a local memory, and re-scans the group of tracks by configuring the tape drive's servoing system in accordance with the stored alignment data for the appended group of tracks. The alignment data for a plurality of appended groups on the tape can be stored and later retrieved from the local memory and used within the servoing system controller to quickly align the scanner to the appended group of tracks without having to recalibrate the scanner to each of the appended groups during subsequent read operations.

16 Claims, 7 Drawing Sheets

METHODS AND APPARATUS FOR CALIBRATION OF A ROTATING SCANNER TO A PLURALITY OF DATA TRACK GROUPS RECORDED ON A TAPE

RELATED APPLICATIONS

This patent application is related to U.S. application Ser. No. 08/941,972, filed Oct. 1, 1997, titled METHODS AND APPARATUS FOR CALIBRATION OF A ROTATING SCANNER TO A TRACK RECORDED ON A TAPE.

TECHNICAL FIELD

The present invention relates to tape drives, and more particularly, to methods and apparatus for calibrating a rotating scanner within the tape drive to a plurality of data track groups recorded on a tape.

BACKGROUND ART

Tape drives, such as, for example, digital data storage (DDS) tape drives are commonly used to back up and record information in the form of digital data from a computer system. A DDS tape drive, for example, is a helical scanning tape drive that writes and reads information in the form of digital data to and from a magnetic tape. DDS tape drives provide a low cost storage mechanism that is light weight, compact and typically very reliable. DDS tape drives have continued to evolve over time, such that each new generation of DDS drives and DDS formatted tapes provides additional storage capacity over the earlier generations.

One advantage of DDS tape drives over linear tape drives is the use of a helical scanning method that allows very high recording densities. Basically, a helical scanning method, such as, for example, in a DDS tape drive, uses a rapidly rotating scanner that has two read heads and two write heads (i.e., for a total of four transducers). The rotating scanner is tilted at an angle in relation to the horizontal movement of the tape, which is being transported at a given speed, and the tape is wrapped about at least a portion of the scanner. Thus, the horizontal tape movement against the tilted and rotating scanner causes diagonally positioned tracks to be written to the tape (and subsequently read from the tape). The speed and tension of the tape are typically kept constant by a tape drive servoing system that includes controlling circuitry and mechanical mechanisms, such as, for example, a capstan and series of rollers and guides.

The format of the recorded data tracks (e.g., containing raw, compressed, timing, control, and/or error correction data) on a DDS formatted tape, for example, is mandated by a specific DDS standard. The DDS2 format, for example, defines that the data tracks are to be written in groups of at least 23 tracks each.

During a read operation of a DDS formatted tape, for example, it is essential to align the read heads to the tracks as written in each of the groups during the previous write operation(s) so as to read the data within each of the groups. This is typically accomplished by adjusting the speed at which the tape is transported to properly align the read heads of the scanner to the previously recorded tracks.

However, since tapes are often used for backing up data and are capable of holding a fairly substantial amount of data, a single tape cartridge is written to several times before filling up. For example, in a DDS2 formatted tape, at least one additional group is added or appended to the tape during each subsequent write operation. It is also common to reuse previously recorded sections of the tape by writing a new group over all or part of an older group or groups, and/or to move a tape between different tape drives.

The result is that there can be several groups recorded on a given tape. Since each of the groups may have been written at a different time and/or at by a different tape drive, the positioning of the data tracks from group to group may be slightly different. For example, in accordance with the DDS2 specification there can be a vertical offset between groups of approximately 6.6 microns.

Thus, a tape drive needs to be configured to detect when the track positioning changes from one group to the next, else the tape drive will not properly read the tracks within each group. These changes typically present a timing issue that requires realignment of the read head(s) to account for differing track positions.

SUMMARY OF THE INVENTION

Thus, there is a need for methods and apparatus for effectively and quickly detecting a track position change relating to a new group of data tracks and realigning the tape and scanner so as to read the new group of tracks.

The present invention provides methods and apparatus that provide efficient, reliable and effective calibration of a tape drive's scanner to one or more groups of tracks recorded on the tape. These methods and apparatus can be included, for example, in a tape drive as part of a servoing system that synchronizes a rotating scanner with the tape during and/or prior to a read operation. The various embodiments of the present invention can be, for example, embodied within a dedicated circuit and/or general purpose circuit, and/or in computer implemented instructions stored in a computer readable medium and for use with a computer processor or like circuit.

Thus, in accordance with an embodiment of the present invention there is provided a method for reading a tape in a tape drive having a scanner. The method includes calibrating the scanner to a first group of tracks recorded on the tape, storing alignment data for the first group of tracks, and scanning the first group of tracks by configuring the tape drive in accordance with the stored alignment data for the first group of tracks.

In accordance with certain embodiments, the method further includes detecting a second group of tracks recorded on the tape, calibrating the scanner to a second group of tracks, storing alignment data for the second group of tracks, and scanning the second group of tracks by configuring the tape drive in accordance with the stored alignment data for the second group of tracks. The stored alignment data is then used in the future to recalibrate the scanner to the group of tracks prior to scanning them.

The earlier stated needs are also satisfied by a calibration method for use with a controller in controlling a speed at which a tape is transported past a rotating scanner. The method including detecting an offset region of an appended group of tracks, setting the tape speed to a first speed, scanning at least a portion of the appended group of tracks with the scanner to produce a set of scanned signals, measuring an envelope and a delay time, calculating an optimal delay time, and setting the speed to a second speed based on the optimal delay time.

In accordance with other embodiments of the present invention an apparatus is provided for use in a tape drive having a rotating scanner. The apparatus includes a controller and a memory. The controller is coupled to the scanner and configured to monitor a scanned signal from the scanner. The controller includes an offset controller for detecting if an offset region has been scanned by the scanner. When an offset region has been detected, the controller enters into a calibration operation and outputs alignment data associated with a group of tracks being scanned by the scanner. The memory, which is preferably within the tape drive, is coupled to the controller and configured to store the alignment data.

The foregoing and other features, aspects and advantages of the present invention will become more apparent from the following detailed description of the present invention when taken in conjunction with the accompanying drawings.

BRIEF DESCRIPTION OF THE DRAWINGS

The present invention is illustrated by way of example, and not by way of limitation, in the figures of the accompanying drawings and in which like reference numerals refer to similar elements in which.

DETAILED DESCRIPTION OF EXEMPLARY EMBODIMENTS

The methods and apparatus of the present invention are applicable to the DDS family of tapes, including DDS1, DDS2 and DDS3 formatted tapes. The present invention is also applicable to other tape formats that, like the DDS family, include indicators within at least a portion of tracks that can be used in calibrating and/or maintaining alignment of the tape drive to the tracks. The methods and apparatus of the present invention use the indicators, for example a sub code in a DDS formatted tape, along with an indexing signal to align the scanner to the tracks recorded on the tape. In accordance with certain embodiments of the present invention, the alignment requires adjusting the speed of the tape to properly align each new group of recorded tracks with the rotating scanner of the tape deck. This is accomplished by detecting when a new group is being scanned and completing a calibration procedure during which an optimal delay time associated with the new group of tracks is determined using data collected from a plurality of scans of the new group while the tape is intentionally transported at a speed that is either faster or slower than a nominal speed. With the collected data, optimal timing information for the new group and a corresponding speed for the tape can be determined. Once the proper speed has been set, then the new group of tracks and the scanner will be significantly aligned and the group of tracks can be read. The results of the calibration procedure are then stored, for example, to a memory located within the tape drive, along with a corresponding identifier for the group's location on the tape. As such, during subsequent read operations of the group of tracks, the proper alignment information for the group of tracks is retrieved from the memory and the scanner is aligned using this information without having to recalibrate the tape drive.

Figure 1:
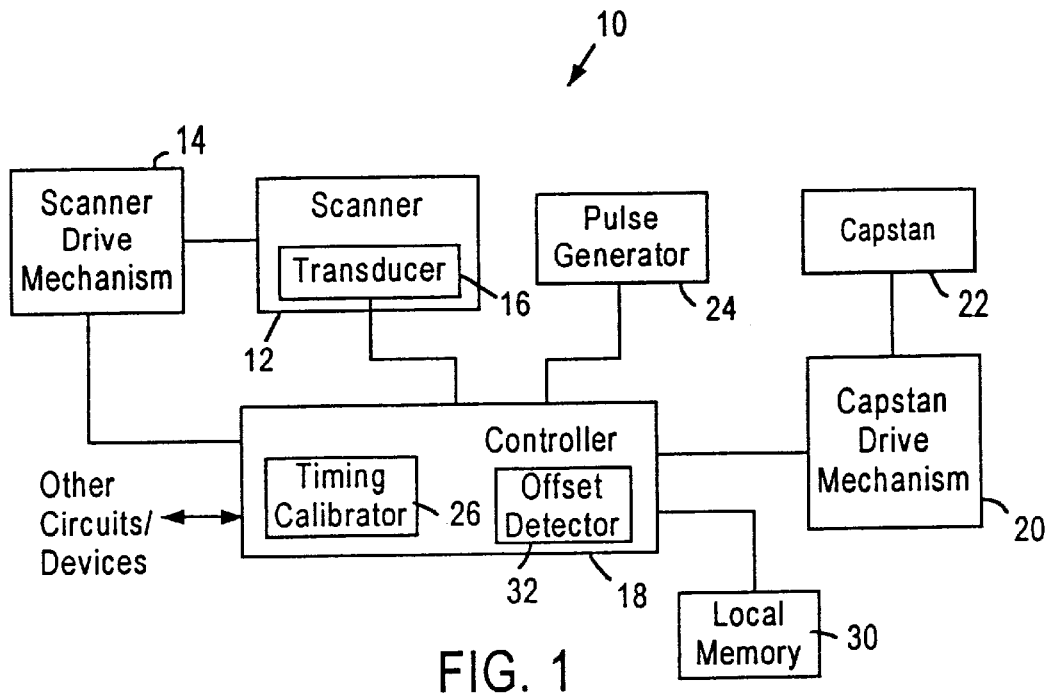
FIG. 1 is a block diagram depicting a tape drive servoing system for use in a tape drive, in accordance with an embodiment of the present invention.

With this overview in mind, FIG. 1 is a block diagram illustrating an exemplary tape drive servoing system 10 for use in a tape drive, in accordance with an embodiment of the present invention. Servoing system 10 includes a scanner 12, a scanner drive mechanism 14, a transducer 16, a controller 18, a capstan drive mechanism 20, a capstan 22, a pulse generator 24, and a local memory 30.

Scanner drive mechanism 14 is coupled to control the rotational movement of scanner 12. Scanner 12 includes at least one transducer 16 for use in either reading data from a tape and/or writing data to the tape. For example, scanner drive mechanism 14, in an exemplary embodiment, includes a motor that is responsive to signals received from controller 18 in rotating a portion(s) of scanner 12. In this example, scanner 12 includes a scanner drum, on which a plurality of transducers 16 are provided. Transducers 16 are typically either read or write heads. By way of example, a conventional DDS scanner includes two read and two write heads. During a write operation, for example, a write head is provided with a data signal containing information, in the form of digital data received from controller 18, that is to be recorded on a tape. Conversely, during a read operation, a read head scans the tape and in response provides a scanned data signal containing information in the form of digital data to controller 18.

Although not depicted, those skilled in the art will recognize that controller 18 is typically coupled to additional circuits/devices, such as a computer processor and associated memory, that generate a data signal to be written to the tape during a write operation and/or processes the scanned data signal as part of a read operation.

Capstan drive mechanism 20 is coupled to control the rotation of capstan 22 in response to a control signal received from controller 18. Capstan 22 moves the tape given direction(s) and at a particular speed, as directed by capstan drive mechanism 20. Thus, for example, in an exemplary embodiment of the present invention, capstan drive mechanism 20 includes an electrical motor (not shown) that drives a capstan roller 21 (see FIG. 2). Capstan roller 21 is placed in contact with the tape such that the rotational movement of capstan roller 21 causes the tape 36 to move proportionally in a longitudinal direction and at a particular speed. In this example, the capstan motor within capstan drive mechanism 20 is responsive to the control signal from controller 18. Controller 18 operates to oversee control of the servoing system 10 as it controls scanner 12 and capstan 22 and as such is responsible for coordinating the movement of the tape and the reading/writing of data from/to the tape.

In accordance with an embodiment of the present invention, controller 18 includes a timing calibrator 26 for use in calibrating or otherwise establishing proper alignment of the tape to scanner 12 during a read operation. Timing calibrator 26 includes logic that is responsive to the scanned signal from transducer 16 and an indexing signal or pulse generator (PG) signal from pulse generator 24. For example, when a tape is inserted into the tape drive and a read operation is selected, controller 18 enters into a calibrate timing process to align the scanner 12 to the tracks recorded on the tape 36. Similarly, when an offset region is detected in the scanned signals, controller 18 enters into a calibrate timing process.

The calibrate timing process of timing calibrator 26 causes controller 18 to adjust the rotational speed of capstan 22 thereby adjusting the speed at which the tape 36 is transported over scanner 12. Adjusting the speed of tape causes the tape to pass by the scanner at a rate that allows the transducer 16 to read the data from the track(s) due to the tape and scanner being significantly aligned to one another. This reduces errors and the need to attempt several re-reads of the tracks.

As discussed in greater detail below, during a calibration timing process, controller 18 examines the scanned signal from at least one transducer 16 and the PG signal from pulse generator 24 to adjust capstan drive mechanism 20 and capstan 22 for proper tracking of a group of tracks recorded on the tape.

Controller 18 also includes an offset detector 32 that monitors the scanned signals from transducer 16 and identifies when transducer 16 passes from one group to another by detecting the offset between groups. This is discussed in greater detail below.

Following a successful calibration timing process, controller 18 provides the calibration results to local memory 30. Local memory 30 is coupled to controller 18 and is configured to store the results of a plurality of calibration timing processes. For example, local memory 30 can be a random access memory (RAM).

Local memory 30 is accessed by controller 18 during subsequent read operations of previously scanned groups of tracks to which scanner 12 has already been calibrated too. By way of example, the calibration results can be stored in local memory 30 as a table that is accessible via an address or other identifier that corresponds to the beginning of a particular group of tracks that has been previously scanned and to which the scanner has been previously calibrated too. As such, controller 18 reads the calibration results from local memory 30 and uses the results to properly align the scanner to the group of tracks upon reaching the corresponding tape address (i.e., at or near the beginning of the group).

Figure 2:
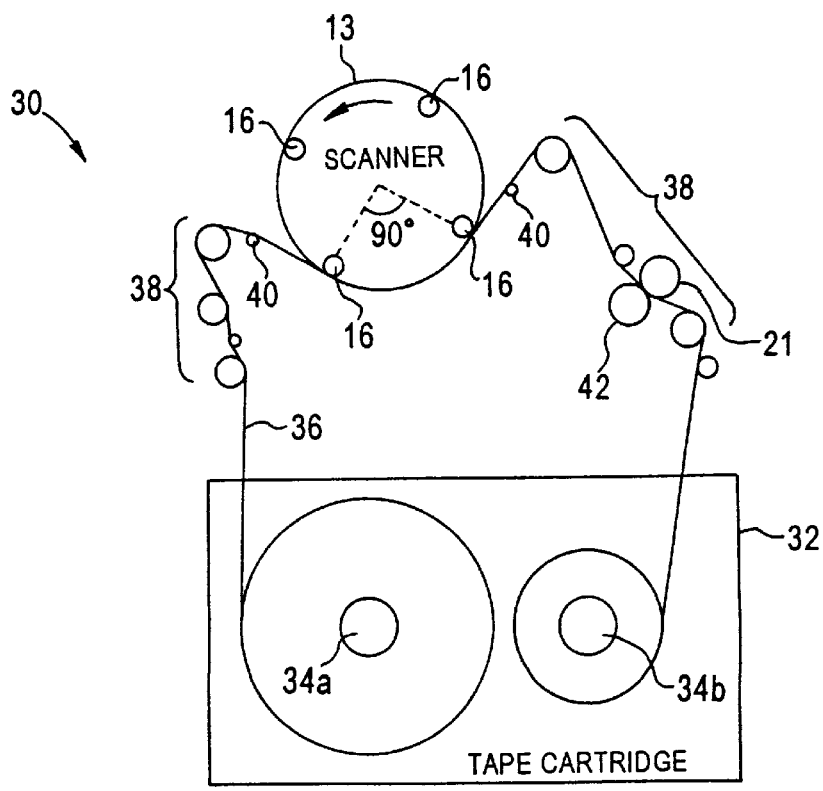
FIG. 2 depicts a tape transport mechanism for use with the tape drive servoing system of FIG. 1, in accordance with an embodiment of the present invention.

FIG. 2 depicts a tape transport mechanism 30 for use with the tape drive servoing system 10 in FIG. 1. Tape transport mechanism 30 provides a mechanism through which a tape 36 is brought into contact with drum 13 of scanner 12. As depicted, tape 36 is provided within a tape cartridge 32, and is connected between two tape reels 34a and 34b therein. Tape 36, upon insertion into the tape drive (or as part of a read operation) is fed through a plurality of tensioning guides 38, inclination posts 40, capstan roller 21, and a pinch roller 42. For example, in a DDS tape drive, tape 36 is brought into contact with drum 13 and wrapped for substantially 90 degrees about drum 13 via tensioning guides 38 and inclination posts 40. Tensioning guides 38 are configured to provide the proper tension to tape 36 as it is wrapped about the portion of drum 13. Inclination posts 40 are configured to control the inclination of tape 36 as it contacts drum 13.

During a read or write operation, capstan roller 21 and pinch roller 42 through which tape 36 feeds, are usually operated such that tape 36 is pulled across drum 13 from tape reel 34a to tape reel 34b. It is recognized, however, that tape 36 can be moved in the opposite direction, namely in a reverse direction, and/or that the arrangement of various guides, rollers and capstan can be rearranged from that depicted in the example in FIG. 2.

Drum 13 includes a plurality of transducers 16 having a known geometry between them. For example, in a DDS formatted disk drive, drum 13 includes four transducers 16 (i.e., two read and two write heads) which are substantially 90 degrees apart from one another as measured from the center of drum 13. The four transducers 16 form two pairs of transducers, wherein the first pair are write heads (located 180 degrees from one another), and the second pair are read heads (located 180 degrees from one another).

Referring back to FIG. 1, pulse generator 24 is an indexing mechanism by which the position of drum 13 (in FIG. 2) is monitored/determined. For example, pulse generator 24 in certain embodiments, includes circuitry that is triggered to provide a pulse for each of the transducers 16 on drum 13 based on a known angle/geometric relationship to the pulse generator indexing mechanism and the transducer 16. Thus, for example, pulse generator 24 may generate a pulse signal fifteen rotational degrees (15°) before a particular transducer 16 is expected to be over, or contact, tape 36. The use of the signal from pulse generator 24 in controller 18 and/or timing calibrator 26 will be discussed in greater detail below.

Figure 3:
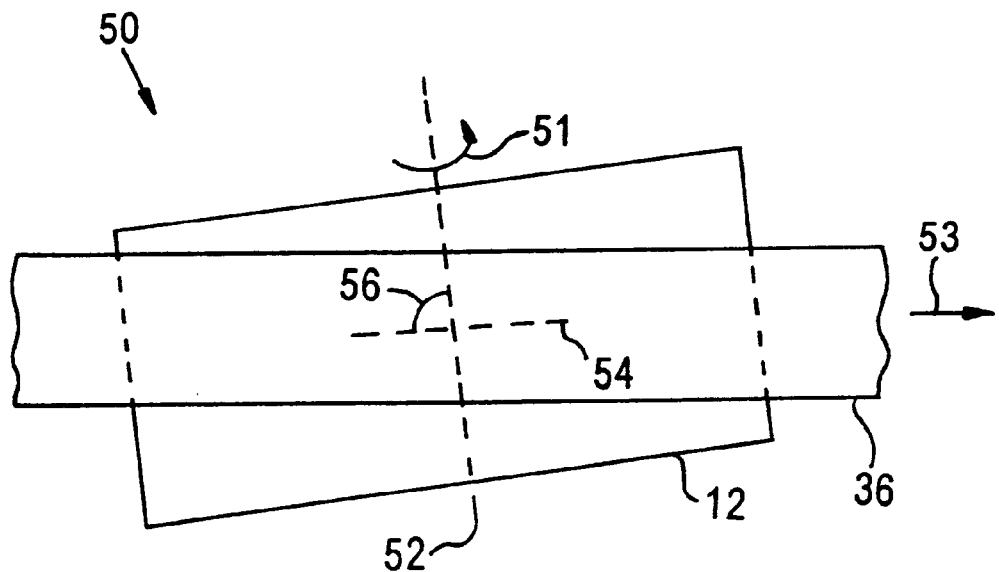
FIG. 3 depicts an interface between a tape and a scanner drum as in FIG. 2, in accordance with an embodiment of the present invention.

FIG. 3 depicts a tape interface 50 as viewed through the tape 36 towards drum 13. From the rotation angle on drum 13, about scanner axis 52, the helical track of drum 13 across the surface of tape 36 can be seen. Thus, when drum 13 is rotated, as depicted by arrow 51, the transducer(s) 16 on drum 13 move or scan diagonally across the surface of tape 36, which is itself moving along a longitudinal axis 54 in the direction depicted by arrow 53. As a result, diagonal tracks are laid down upon tape 36 during a write operation. Similarly, in a later read operation the tracks are scanned by a read head traveling in the same direction as the write head.

FIGS. 4a–b and 5a–b depict various features of the data tracks recorded on a formatted tape in accordance with an exemplary embodiment of the present invention.

Figure 4A:
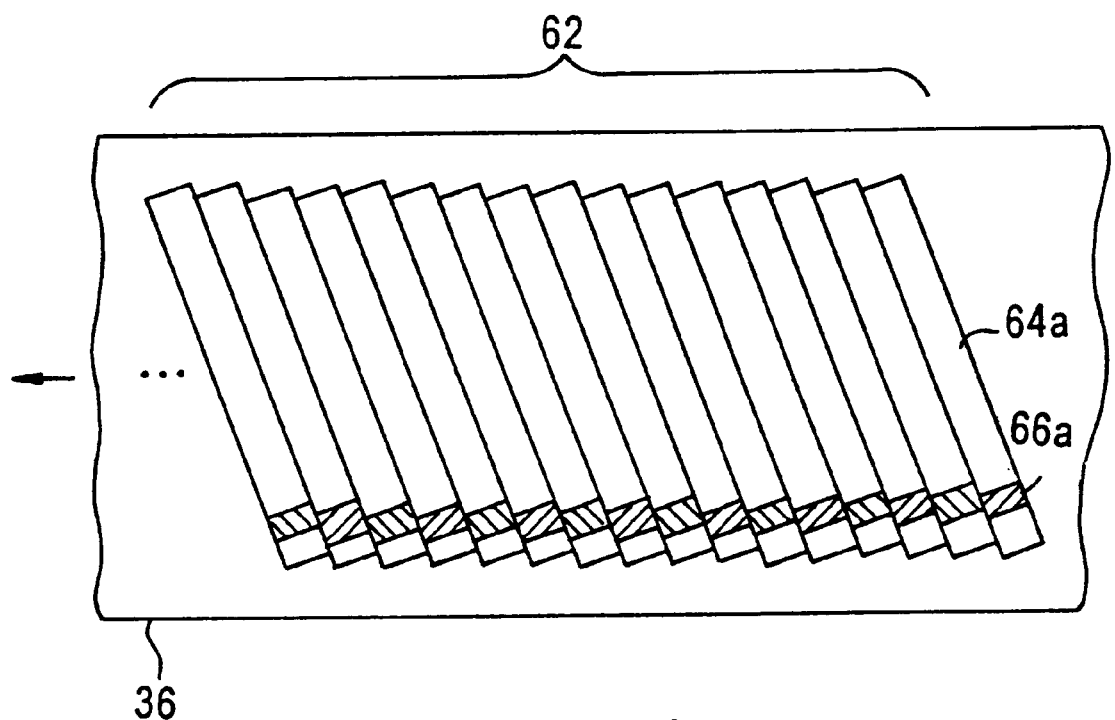
FIGS. 4a and 4b depict tapes having a plurality of data tracks recorded thereon in one or more groups and formatted in accordance with an embodiment of the present invention.

FIG. 4a depicts a tape 36 having a group of tracks 62a recorded diagonally across the recording surface of tape 36. Note, that tape 36 is illustrated as viewed from drum 13, in contrast to FIG. 3, and therefore the tape is moving in an opposite direction in this figure when compared to FIG. 3. Tape 36 is not drawn to scale and the actual length of the diagonal tracks are substantially longer due to the typically small angle 56 (see FIG. 3) between the longitudinal axis 54 of tape 36 and scanner axis 52. For example, angle 56 in a conventional DDS formatted tape is approximately 6 degrees.

Within each track in the group of tracks 62a, such as track 64a, there is a sub code area 66a, wherein sub code or a similar type of data is recorded. Note, that it is recognized that there may be a plurality of sub code areas, such as, for example, in a DDS2 formatted tape, or that there may be formats that only record sub code data in particular tracks.

Moreover, while shown in FIGS. 4a–b and 5a–b as being located nearer to one end of the track, it is recognized that the sub code area 66 can be located anywhere within a track.

Figure 4B:
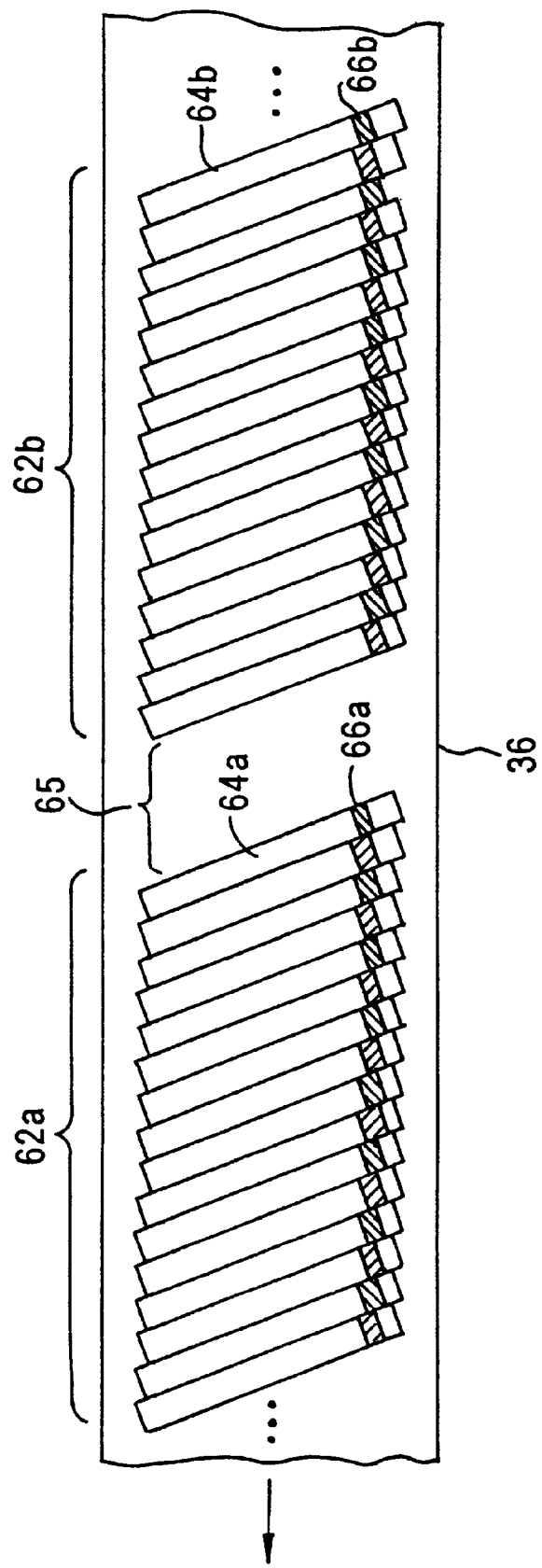

FIG. 4b depicts tape 36 having two groups of tracks 62a and 62b. Between the groups of tracks 62a and 62b, there is shown an illustrative space 65. Space 65 is 20 preferably substantially small enough that there is no more notable difference between groups 62a and 62b and the adjacent tracks within a single group of tracks.

If, however, tape 36 is moved, for example, from one tape drive wherein group 62a is written, to another tape drive wherein group 62b is written, the positioning of groups 62a and 62b on tape 36 can vary with respect to the tape edge, for example, there can be differing vertical offset regions having different distances and/or a different horizontal space 65. Thus, there is a need to identify when a new or appended group of tracks is scanned, so that the tape drive servoing system 10 can be aligned for a successful read operation.

Figure 5A:
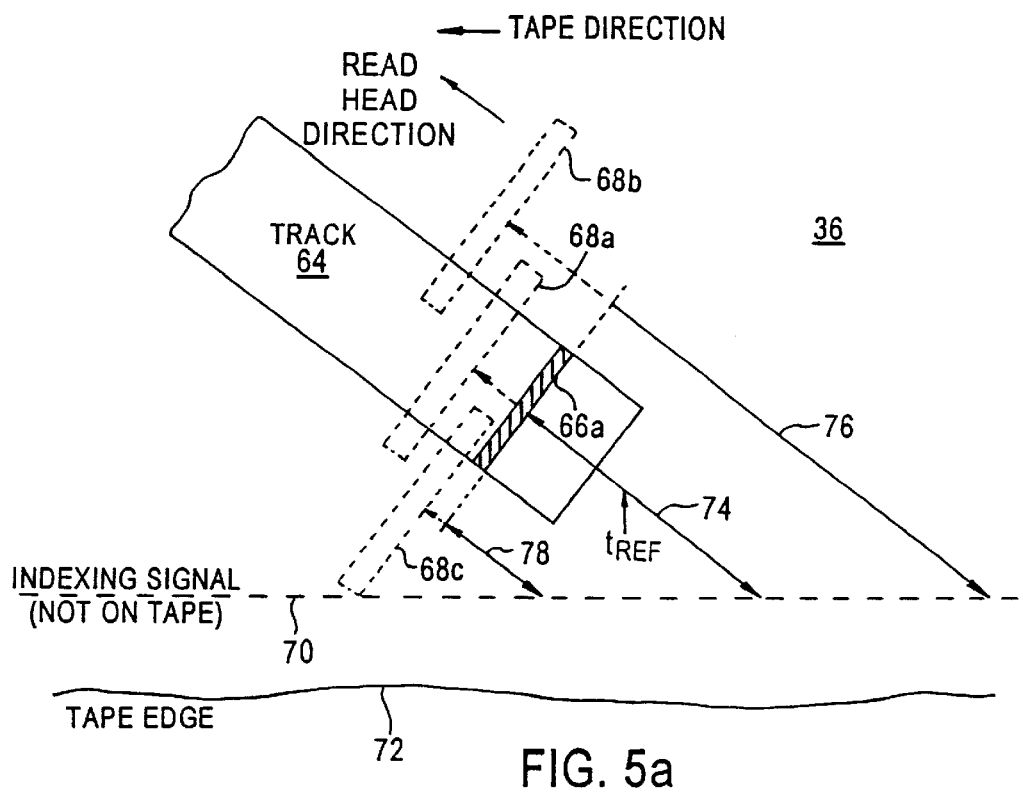
FIGS. 5a and 5b depict a portion of a track as recorded on the tapes in FIGS. 4a and 4b, respectively, and formatted in accordance with an embodiment of the present invention.

A portion of data track 64a is depicted in FIG. 5a. As shown, data track 64a is recorded onto tape 36 and includes a sub code area 66a. Data track 64a is positioned in a diagonal direction leading away from a lower tape edge 72. Tape edge 72 is depicted, for illustrative purposes, as having a less than perfectly straight edge. Track 64a is offset from tape edge 72 by a finite distance.

FIG. 5a depicts exemplary the potential positions 68a-c that may be followed by a read head 16 during a subsequent read operation in which data track 64a is to be scanned. A properly aligned read head 16 is depicted in position 68a. In position 68a, read head 16 scans substantially all of track 64a. Conversely, a misaligned read head 16 is depicted by positions 68b and 68c. Notice that in positions 68b and 68c only a portion of track 64a is being scanned.

Although not actually a part of the information recorded on tape 36, there is further illustrated in FIG. 5a a point 70 (as depicted by a dashed line) wherein during a scanning cycle (e.g., as depicted by the positions 68a–c and associated diagonal scanning directions) a timing signal is generated based on the rotational position of the scanner 12. Based on the occurrence of the timing signal at point 70, it is possible to measure a delay time from point 70 until sub code area 66a is scanned. Such a delay time is shown for each of the positions 68a–c for the read head 16 and the detection of sub code area 66a within track 64a.

For a substantially aligned read head 16, at position 68a, there is depicted an optimal delay time 74 as measured from an occurrence of an indexing signal at point 70 to detection of the sub code area 66a when read head 16 scans the sub code data recorded within the sub code area 66a. This optimal delay time will be referred to as $t_{REF}$.

In the case of a misaligned read head 16 at position 68b, there is depicted a longer delay time 76 as measured from an occurrence of an indexing signal at point 70 to detection of the sub code area 66a when read head 16 scans a portion of the sub code data recorded within the sub code area 66a.

Similarly, in the case of a misaligned read head 16 at position 68c, there is depicted a shorter delay time 78 as measured from an occurrence of an indexing signal at point 70 to detection of the sub code area 66a when read head 16 scans a portion of the sub code data recorded within the sub code area 66a.

Figure 5B:
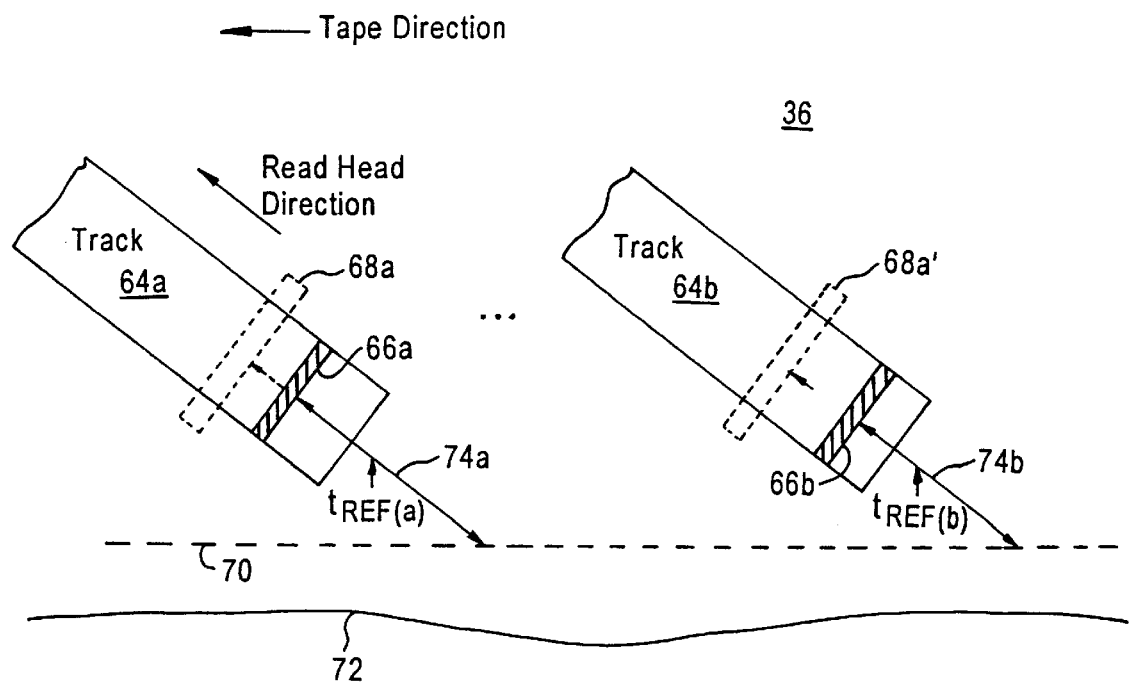

FIG. 5b depicts two different tracks 64a and 64b, as in FIG. 4b, from an initial group 62a and a subsequently appended group 62b, respectively, as recorded on tape 36. Positions 68a and 68a' are for a substantially aligned read head 16 scanning over tracks 64a and 64b, respectively. As illustrated, there is associated with each of the tracks (and, therefore each of the groups) an optimal delay time $t_{REF}$ as measured or otherwise determined between the indexing signal at point 70 and the detection of the sub code data in the associated sub code area 66a and 66b. The optimal delay time for group 62a is $t_{REF(a)}$ 74a, wherein the read head 16 scans over track 64a in a substantially aligned path as shown by position 68a. Likewise, the optimal delay time for group 62b is $t_{REF(b)}$ 74b, wherein the read head 16 scans over track 64b in a substantially aligned path as shown by position 68a'. Thus, for example, if group 62a is closer to edge 72 than group 62b, then $t_{REF(a)}$ will be inherently shorter in duration than $t_{REF(b)}$ due to the shorter distance for the read head 16 to travel during rotation.

Figure 6:
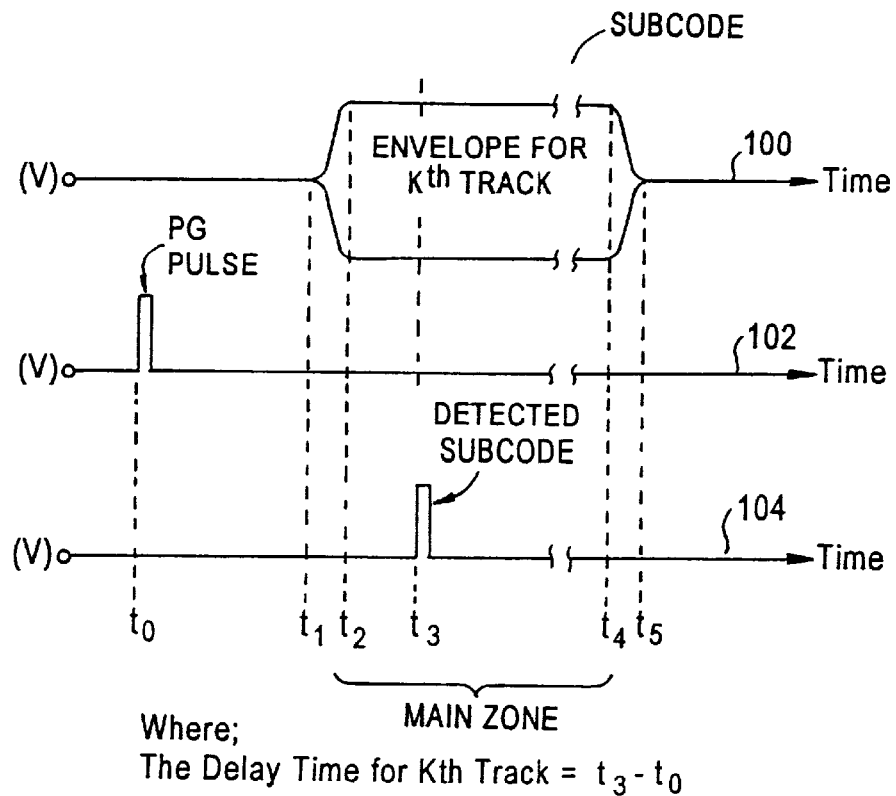
FIG. 6 is a timeline graph depicting an envelope of a scanned signal from a data track as in FIGS. 4a–b and 5a–b, an indexing signal and a detected sub code signal, in accordance with an embodiment of the present invention.

FIG. 6 is a timeline graph depicting the timing references used by controller 18 during a calibration timing process of a group of tracks (e.g., 62a or 62b) in accordance with an embodiment of the present invention. Note that the signals in FIG. 6 are illustrative only, and are therefore not drawn to scale. Furthermore, the signals depicted in FIG. 6 are for a single scan of the tape 36 based on a significantly aligned read head 16 scanning a signal track 64a, at position 68a as for example in FIGS. 5a–b. The uppermost signal is a detected envelope 100 associated with the plurality of fluctuations of the signal from readhead 16 as it scans and detects the data recorded within track 64a. Envelope 100 begins at approximately time t, and ends at approximately time $t_5$. Envelope 100, for example, is detectable via a conventional envelope detection circuit configured to receive a scanned signal from read head 16 or a conditioned scanned signal that was originally generated by read head 16.

The center signal in FIG. 6 is an indexing pulse signal 102 as provided to controller 18 by pulse generator 24. As shown, there is a pulse occurring at time $t_0$. The pulse (i.e., PG pulse) is generated by pulse generator 24 when drum 13 passes by an index at approximately time to. For example, an optical, mechanical, and/or magnetic switching/indicating device can be provided within pulse generator 24 to detect the position of drum 13 about scanner axis 52.

The bottom signal in FIG. 6 is a detected sub code signal 104 generated within controller 18 based on the scanned signal from read head 16. As depicted, a pulse is provided when the sub code data is read for a given scan. By way of example, a detection circuit (not shown) within controller 18 can be used to isolate and/or identify a particular sub code frequency signal in the scanned signal, from which a transition, such as, for example, a pulse can be generated. In this example, the sub code data was detected at approximately time $t_3$.

Although signals 102 and 104 are depicted as having pulses indicative of the timing of certain referencing events, it is recognized that other types of transitioning signals can be used, such as , for example, a logical transition can occur to indicate the referenced time.

For a properly aligned scanner and group 62a, the delay time between the pulses in signals 102 and 104 is the $t_{REF}$. Thus, for example, in FIG. 6 $t_{REF}=t_3-t_0$. Furthermore, when the scanner and group 62a are properly aligned, the delay times associated with a plurality of scans (i.e., tracks within group 62a), are approximately equal to one another (provided that the sub codes are recorded in the tracks at or about the same location within each of the tracks). Thus, there is an optimal $t_{REF}$, (i.e. $t_{REF(a)}$) for group 62a. The same is of course true for any subsequent or prior group of tracks, such as appended group 62b, although the optimal $t_{REF}$ often varies between groups.

To calibrate (e.g., substantially align) the scanner to the tracks in a group, it is therefore necessary to measure or otherwise determine the optimal $t_{REF}$ for the group and to alter the tape drive during a read operation of the group so that the delay times associated with the tracks in a group are approximately equal to the optimal $t_{REF}$ for the group.

Once the $t_{REF}$ for the group is determined, the speed at which the tape is transported is adjusted to cause each measured $t_{REF}$ to approximately equal the optimal $t_{REF}$. Thus, if the measured delay times are greater than the optimal $t_{REF}$ then the tape is running at a speed that is too slow (e.g., as in the case of read head 16 scanning to position 68b in FIG. 5a). Conversely, if the measured delay times are less than the optimal $t_{REF}$ then the tape is running at a speed that is too fast (e.g., as in the case of read head 16 scanning to position 68c in FIG. 5a).

To determine the optimal $t_{REF}$ for a group of tracks, in accordance with one embodiment of the present invention, timing calibrator 26 causes controller 18 to enter into a calibrate timing process wherein controller 18 provides a control signal (e.g., a position error signal (PES)) to capstan drive mechanism 20 that causes the tape to be transported at a first speed. The first speed is either greater than or less than an expected or nominal speed for the tape format. For example, in one embodiment the first speed is approximately 10 percent greater than the nominal speed. As such, the tracking for the group is intentionally misaligned.

When the scanner 12 is misaligned read head 16 is not centered over track 64a, for example, read head 16 eventually travels across the track with the offset during a scan. Moreover, for a set of K number of scans within a group, the resulting envelopes of the scanned signals will reflect this misalignment as the envelopes, when compared to one another, rise and fall in crossing over adjacent tracks, and/or as a track is only slightly covered by the read head 16 resulting in a lower average amplitude for the envelope. For a linearly well aligned system, head 16 will be off track equal ammounts from the start to the end of he track.

As discussed below, by comparing the results from a plurality of scans in the set of K scans wherein the scanner 12 is intentionally misaligned, it is possible to determine when read head 16 is properly aligned, or as aligned as possible, with the group of tracks, and to thereby further determine the corresponding optimal $t_{REF}$ for the group.

Figure 7:
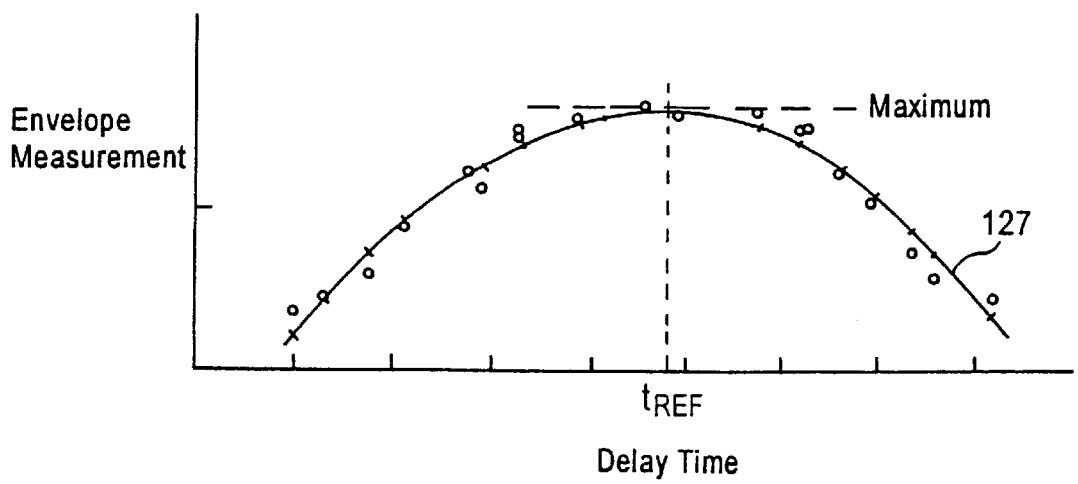
FIG. 7 is a graph depicting envelope measurements for a plurality of scans versus corresponding measured delay times, in accordance with an embodiment of the present invention.

Before discussing an exemplary method for determining an optimal $t_{REF}$, the relationship between the three signals in FIG. 6 will first be described. FIG. 7 depicts a graph of envelope measurements versus measured delay times for a set of scans (e.g., K=20) of a tape 36 running at approximately 1.1 times nominal speed (i.e., about 10% faster than normally expected). Running the type at this increased speed (or, similarly at a decreased speed ), causes each scan to be off-track, wherein some scans will be more on-track than others but still not properly aligned. The difference between scans is the used to determine the proper speed required to optimize the alignment, in accordance with an embodiment of the present invention.

Each of the square marks, in FIG. 6, represents a normalized sum of a plurality of sampled amplitudes for an envelope (i.e., an envelope measurement). It is preferred that the sample amplitudes be collected during a main zone period (e.g., see FIG. 6 between times $t_2$ and $t_4$). For example, in one embodiment, eight samples are taken at approximately equal intervals during the main zone period. These samples are then summed together and the result is normalized to produce an envelope measurement.

In FIG. 7, the envelope measurements for each Kth scan are plotted along the y-axis of the graph and at positions along the x-axis of the graph corresponding to the measured delay times for the each of the scans. As shown, there is a characteristic parabolic shape to the data plotted in FIG. 7. This parabolic shape is used to determine the optimal $t_{REF}$ for the group of tracks.

In accordance with an exemplary embodiment of the present invention, the set of data that leads to this parabolic shape is curve fitted with an approximating function, for example a second order polynomial function is determined by applying a least squares technique to the data set. In FIG. 7 the "Xs" represent such a curve fitting as illustrated by connecting curve 127.

After an approximating function has been determined, the maximum local value (i.e., the Y-axis maximum) for the function and the corresponding $t_{REF}$ (i.e., along the X-axis) for this maximum value are calculated. This corresponding $t_{REF}$ is, therefore, the optimal $t_{REF}$ (as estimated). This optimal $t_{REF}$ for the group can then be used within controller 18 to adjust the speed of the tape during subsequent scans of the group to the point where the measured delay time for the subsequent scans of the tracks within the group are approximately equal to the optimal $t_{REF}$ for the group.

For a tape having two or more groups of tracks, such as, for example, tape 36' in FIGS. 4b and 5b, it is necessary to detect when one group of tracks ends and the next group of tracks begins. In accordance with one embodiment of the present invention, the delay time $t_{REF}$ is monitored to determine when the read head 16 begins to cross over the offset region of an appended group of tracks. The $t_{REF}$ can be monitored directly or indirectly. For example, $t_{REF}$ can be monitored indirectly by way of the control signal(s) generated in response to changes in the measured $t_{REF}$. Thus, when there is a sudden shift in the measured $t_{REF}$, such as, for example, when the new tracks (i.e., in group 62b) are positioned either closer or farther away from edge 72 than the previous tracks in group 62a, there will be a corresponding change in the control signal(s) (e.g., the PES signal) provided to capstan drive mechanism 20 by controller 18.

Thus, by monitoring the control signal(s) along with the envelope 100 for a predetermined number of consecutive tracks, the offset detector 32 in controller 18 can detect when an offset occurs and the servoing system 10 needs to be calibrated.

By way of example, assume that read head 16 has just scanned over an offset region associated with group 62b. As a result of this change in the measured $t_{REF}$ for the group 62b as compared to the $t_{REF}$ for group 62a, controller 18 changes the control signals(s) in an attempt to compensate for the slight variations of $t_{REF}$. During, and following, this transition period, offset detector 32 monitors the control signal(s) (e.g., the magnitude) and the scanned signal as detected by the envelope detector. If, for example, the magnitude of the control signal(s) has a sudden jump and the envelope of the scanned signal for the tracks immediately following the jump is still near a predefined maximum amplitude, then offset detector 32 has identified that an actual offset has occurred. Offset detector 32, in one embodiment, therefore produces one or more signals that indicate that a calibration of the scanner to the tape needs to occur. For example, offset detector 32 outputs a logical signal or sets a flag bit that causes controller 28 to enter into a calibration mode.

If controller 18 receives information from offset detector 32 regarding a detected offset region, and is satisfied with the detection information, then controller 18 determines the alignment data for the new group of tracks by executing a calibrate timing process. This process is discussed in greater detail below.

Once the calibration timing process has been completed by the timing calibrator 26 and controller 18, then controller 18 will store the resulting alignment data in local memory 30 for possible use at a later time. Additionally, the speed of the tape is adjusted by controller 18, in accordance with the new alignment data, and in particular the optimal $t_{REF}$ for the new group. Being properly aligned for the new group, the tape drive is then directed by controller 18 to rewind or otherwise move the tape back to approximately the beginning of the new group, and the new group is scanned over again at the proper speed.

Figure 8:
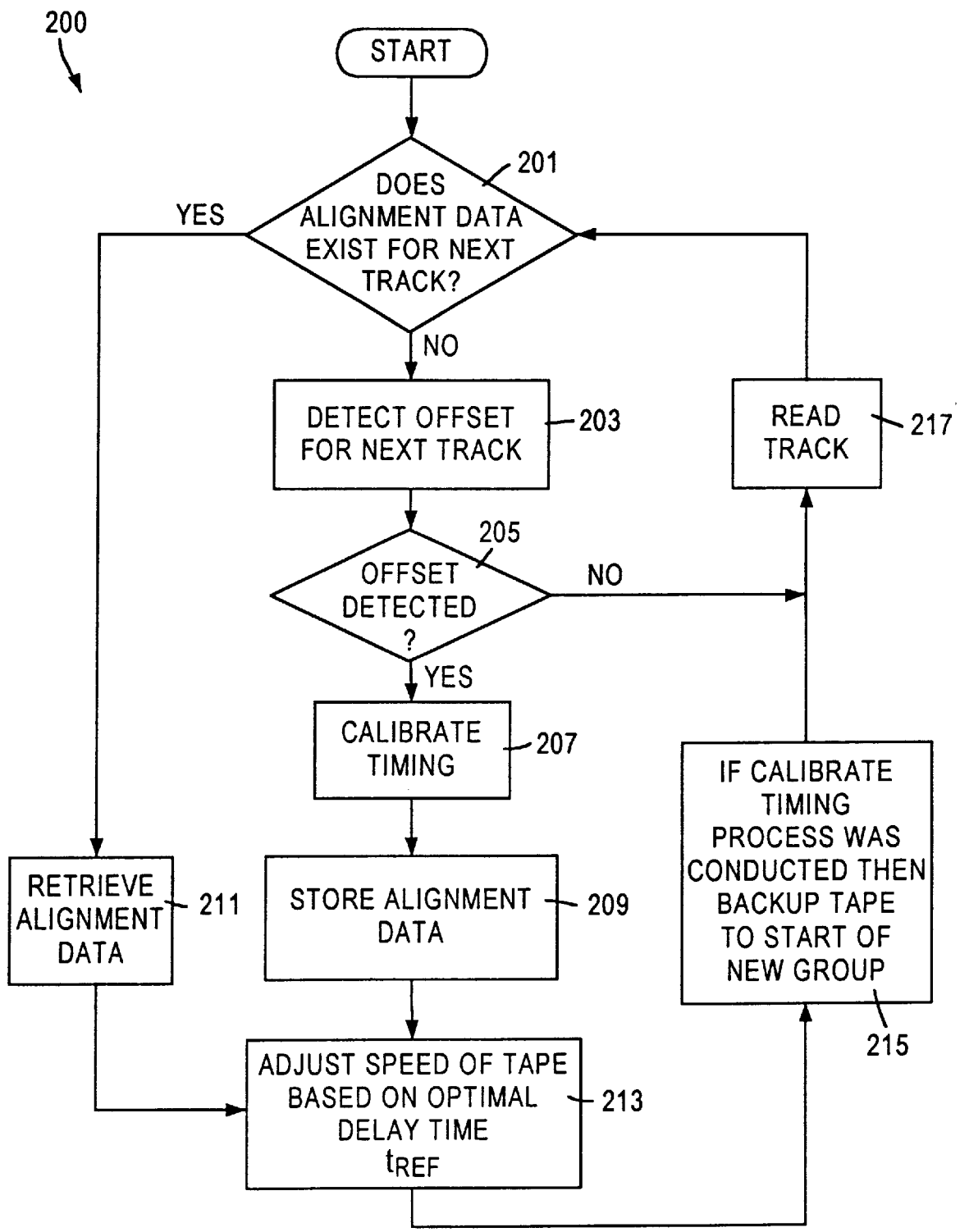
FIG. 8 is a flow chart depicting a method for timing track adjustment including a calibrate timing step, in accordance with an embodiment of the present invention.

FIG. 8 illustrates a method 200 for timing track adjustment of a tape having appended groups of tracks, in accordance with an embodiment of the present invention.

Method 200 begins with step 201, wherein it is determined if alignment data exists for the next expected track. This can be accomplished, for example, by controller 18 accessing local memory 30 to determine if, based on a track identifier, alignment data from a previous calibration operation exists. If no alignment data is available for the next expected track, then method 200 proceeds to step 203. In step 203, the scanned signal, related signals, and/or control signal(s) associated with servoing system 10 are monitored during the next scan to detect an offset region between the previously scanned tracks and the newly scanned track. For example, in step 203, an offset detector 23 can be configured to monitor the scanned signal, either directly and/or indirectly, to detect a jump in the measured delay time from the previous track(s) to the new track. In certain embodiments, offset detector 32 in step 203 further monitors, either directly or indirectly, the resulting control signal(s) of servoing system 10, and an envelope of the scanned signal. Offset detector 32 compares these monitored or otherwise sampled signals to one or more threshold values to determine if an offset region has been scanned. Next, in step 205, it is determined whether an actual offset has occurred by comparing a plurality of offset detections for a finite number of scans. This reduces possible errors. Until step 205 is satisfied that an actual offset region has been detected, method 200 proceeds to read the track in step 217 and then returns to step 201. If an actual offset region has been detected via steps 203 and 205, then method 200 proceeds to step 207, which is a calibrate timing process.

In calibrate timing process 207 an optimal $t_{REF}$ for the new group of tracks is determined. Once the optimal $t_{REF}$ for the new group is determined in calibrate timing process 207, then method 200 proceeds to step 209 wherein the resulting alignment data is stored for future use. For example, step 209 can include storing the optimal $t_{REF}$ for the new group and an identifier for the first track of the new group in local memory 30. Next, in step 213, the speed of the tape is adjusted based on the optimal $t_{REF}$ for the new group, as determined in process 207. Thus, once the tape speed is adjusted the tracks in the new group are significantly aligned with the tape drive and can be properly read.

Referring back to step 201, if alignment data for the next expected track already exists, for example in local memory 30, then the alignment data is retrieved in step 211 and used in step 213 to adjust the speed of the tape prior to reading the next track, in step 217.

In step 215, if a calibrate timing process was conducted in step 207, then the tape is rewound or otherwise returned to the start of the new group so that the tracks in the new group can be read, at the proper speed (i.e., with the tape drive properly aligned) in step 217.

Figure 9:
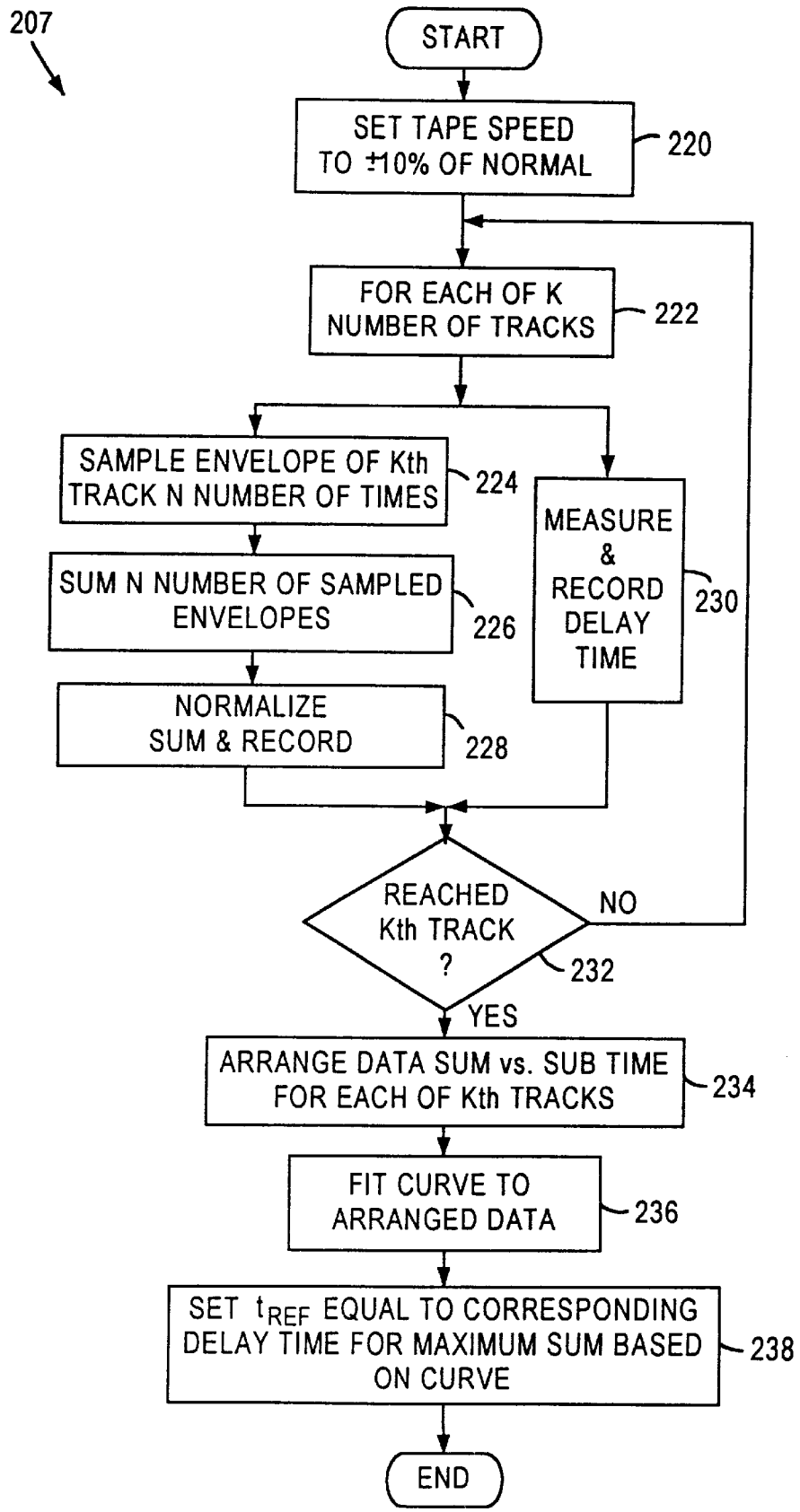
FIG. 9 is a flow chart depicting a calibrate timing process, as in FIG. 8, in accordance with an embodiment of the present invention.

FIG. 9 further illustrates calibrate timing process 207 in accordance with an embodiment of the present invention. Process 207 includes step 220 wherein the tape speed is set to a first speed that is either greater or less than an expected or nominal speed of the tape. For example, the tape speed is adjusted in an exemplary embodiment by plus or minus 10 percent of the nominal speed.

While the tape is running at the first speed, in step 222 a sample portion of the tape is scanned K number of times (preferably less than the minimum number of tracks in a group) using one or more read heads 16. In step 224 the envelope for each of the scanned tracks (albeit potentially misaligned) is sampled N number of times, preferably at substantially even intervals within a main zone of the envelope. Next, in step 226, the N number of sampled envelope voltages are summed together. In step 228, the result of step 226 is then normalized with respect to zero volts and the resulting envelope measurement is recorded. Additionally, for each of the K number of scans in step 230, the corresponding delay time is measured and recorded based on the indexing signal and the detected sub code data.

Next, in step 232, it is determined if the end of the scanned set has been reached, i.e., has the Kth scan occurred. If the answer is no, then process 207 returns to step 222 and the next Kth number scan is completed. If the answer to decision 232 is yes, then the sample set has been completed and process 207 continues with step 234.

In step 234, the data (i.e., the envelope measurement and corresponding delay time for each of the K number of scans, or a subset thereof) is arranged for processing via a curve fitting procedure that occurs at step 236. For example, the data can be further processed and/or stored in a particular data structure within a memory (not shown). Step 236 provides a curve fitting procedure wherein the arranged data in 234 is fit to a second order polynomial curve or other like approximating function using a curve fitting technique, such as, for example, a least squares approximating technique.

Once the curve fitting has been completed in step 236, then in step 238 the calibrate timing process 207 is concluded by using the approximating function to calculate an optimal $t_{REF}$ for the new group. In step 238 the optimal $t_{REF}$ is determined by finding a local maximum for the approximating function and determining a corresponding delay time for the maximum value. The corresponding delay time is then considered to be the optimal $t_{REF}$ for the new group.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A method for reading a tape in a tape drive having a scanner, the method comprising:

calibrating the scanner to a first group of tracks recorded on the tape;

storing data for the first group of tracks, the stored data comprising alignment data resulting from the calibrating of the scanner to the first group of tracks and a tape address associated with the first group of tracks; and scanning tracks recorded on the tape wherein for tracks associated with the stored tape address the scanning includes configuring the tape drive in accordance with the stored alignment data for the first group of tracks.

2. The method as recited in claim 1, further comprising:

detecting a second group of tracks recorded on the tape;

calibrating the scanner to the second group of tracks; and storing data for the second group of tracks, the stored data for the second group of tracks comprising alignment data resulting from the calibrating of the scanner to the second group of tracks and a tape address associated with the second group of tracks;

wherein for tracks associated with the stored tape address associated with the second group of tracks, the scanning includes configuring the tape drive in accordance with the stored alignment data for the second group of tracks.

3. The method as recited in claim 2, wherein each step of storing data comprises updating a table in a memory.

4. The method as recited in claim 2, wherein detecting a second group of tracks includes:

monitoring a scanned signal from the scanner while scanning from the first group of tracks to the second group of tracks; and detecting a positional change of at least one track within the second group of tracks with respect to an indexing signal via at least one parameter of the scanned signal.

5. The method as recited in claim 1, further comprising:

storing alignment data for each one of a plurality of appended groups of tracks recorded on the tape and a respective tape addresses for each one of the appended groups of tracks; and scanning tracks identified by the respective tape address for each of the plurality of appended groups of tracks by configuring the tape drive in accordance with the stored alignment data for each of the appended groups of tracks.

6. The method as recited in claim 1, further comprising rescanning tracks recorded on the tape, wherein for tracks associated with the stored tape address the rescanning includes again configuring the tape drive in accordance with the stored alignment data for the first group of tracks.

7. The method as recited in claim 1, wherein the configuring of the tape drive comprises controlling speed of the tape.

8. A method for reading a tape in a tape drive having a scanner, the method comprising:

calibrating the scanner to a first group of tracks recorded on the tape, storing alignment data for the first group of tracks resulting from the calibrating of the scanner to the first group of tracks, wherein: the storing of alignment data includes updating a table in a memory, and the table includes an indicator that identifies the first group of tracks and the alignment data for the first group of tracks and scanning the first group of tracks by configuring the tape drive in accordance with the stored alignment data for the first group of tracks.

9. An apparatus for use in a tape drive, the apparatus comprising:

a scanner for scanning tracks on the tape and generating signals in response to said scanning:

a memory for storing alignment data for the scanner and tape address data:

a controller coupled to the scanner and configured to monitor the signals from the scanner, determine and write alignment data and tape address data to the memory for each of a plurality of groups of tracks scanned by the scanner, and supply alignment data associated with a predetermined tape address from the memory to the scanner to control scanning of a group of tracks identified by the predetermined tape address.

10. The apparatus as recited in claim 9, further comprising a signal generator configured to generate an indexing signal based on at least one predetermined rotational position of the scanner, and wherein the controller is further configured to measure a delay time, based on the indexing signal and detection of sub code data within the signals from the scanner, and calculate an optimal delay time as a value for alignment data when the scanner and the group of tracks would be substantially aligned.

11. The apparatus as recited in claim 9, wherein the scanner comprises a helical scanner.

12. The apparatus as received in claim 9, wherein the controller comprises: means for measuring an envelope of the signals from the scanner, means for determining a time delay between a scanner index and detection of a sub-code within the signals from the scanner, and means to calculate an optimum delay to achieve a maximum value of the envelope.

13. A calibration method for a scanner for reading information from a moving tape, comprising:

scanning at least one track of each of a plurality of groups of tracks on the tape with the scanner as the tape moves past the scanner;

in response to a signal produced by the scanning, determining alignment data for optimum scanning of tracks of each one of the groups of tracks scanned by the scanner;

for each one of the scanned groups of tracks, storing the determined alignment data in association with a tape address of the group of tracks;

determining a tape address of one or more tracks to be read from the tape; and using the stored alignment data associated with the tape address of the one or more tracks to be read from the tape to calibrate the scanner for reading of the one or more tracks.

14. The method as recited in claim 13, wherein each stored alignment data comprise a control value related to speed of the tape movement past the scanner.

15. The method as recited in claim 13, wherein the control value comprises an optimal delay time between rotational index position of the scanner and scanner detection of a sub code within a data track of a respective group.

16. An apparatus comprising:

a tape scanner for scanning tracks on a tape in a manner specified by at least one alignment parameter; and calibration means responsive to scan signals from the scanner during a calibration operation for determining and storing values of the alignment parameter for respective groups of tracks and supplying a selected one of the stored values to the tape scanner during a read-operation of the scanner.

* * * * *